June 30, 1931. K. SCHAPEL 1,812,451
SAFETY PROPELLER
Filed Feb. 8, 1930 4 Sheets-Sheet 1

Inventor
Karl Schapel

June 30, 1931.  K. SCHAPEL  1,812,451
SAFETY PROPELLER
Filed Feb. 8, 1930  4 Sheets-Sheet 2
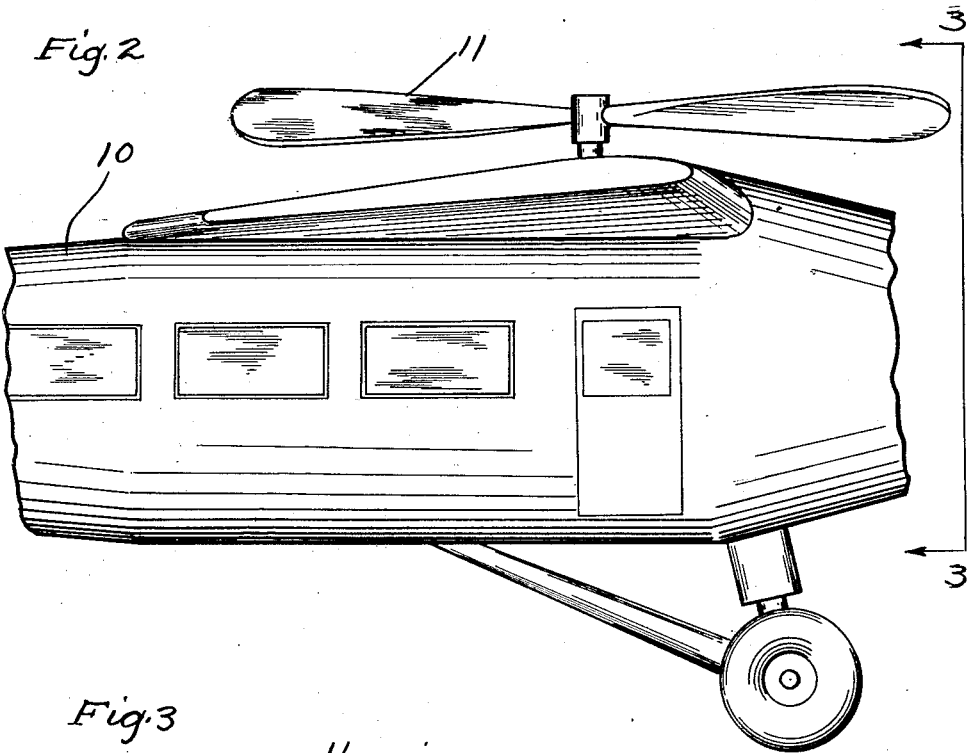
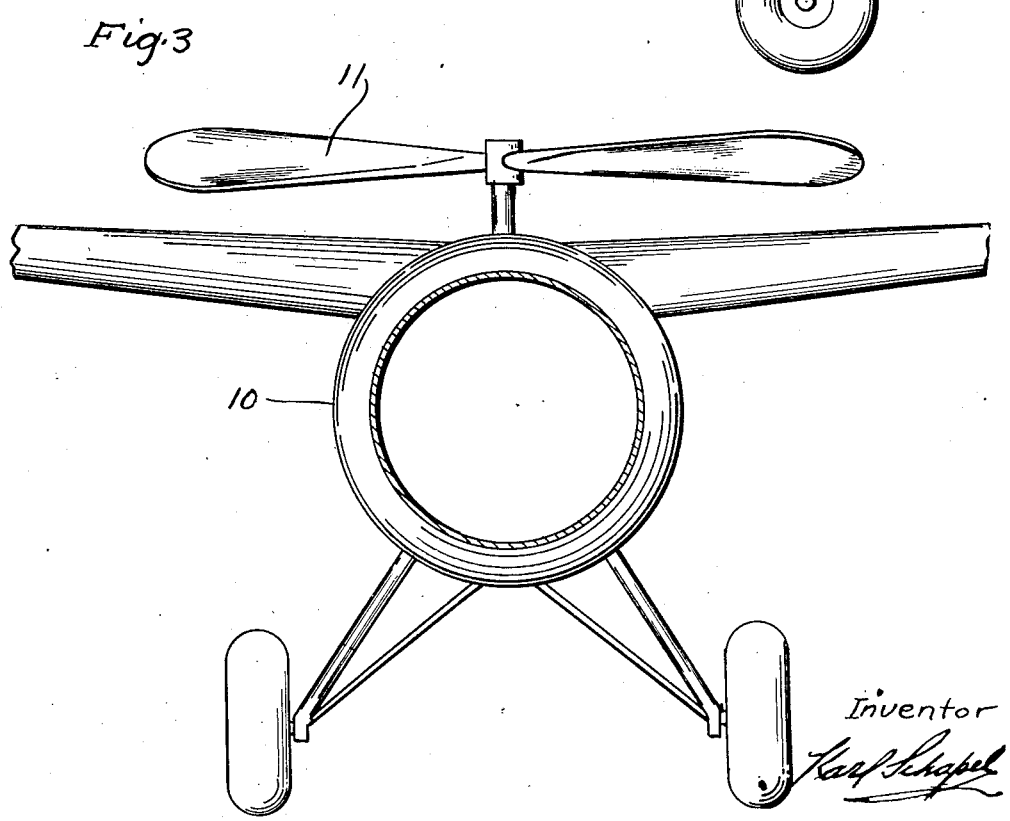
Inventor
Karl Schapel June 30, 1931.  K. SCHAPEL  1,812,451
SAFETY PROPELLER
Filed Feb. 8, 1930   4 Sheets-Sheet 3

Inventor
Karl Schapel

June 30, 1931.  K. SCHAPEL  1,812,451
SAFETY PROPELLER
Filed Feb. 8, 1930  4 Sheets-Sheet 4
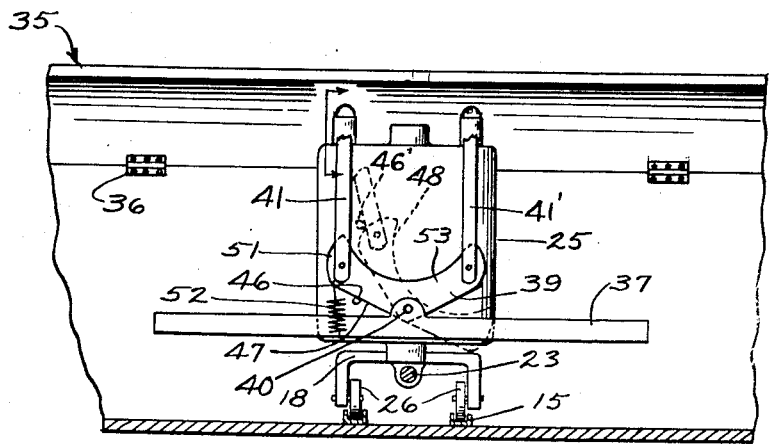
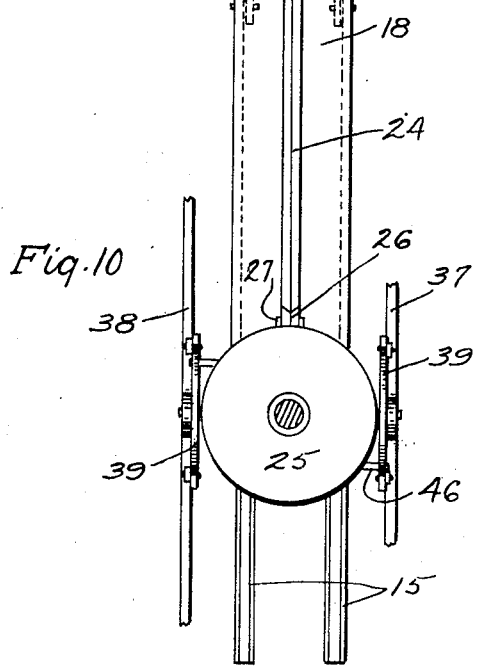
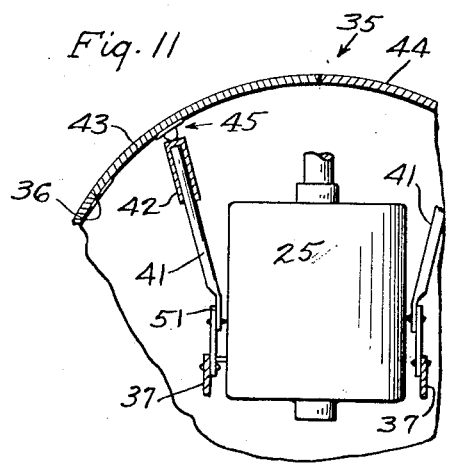
Inventor
Karl Schapel Patented June 30, 1931

1,812,451

UNITED STATES PATENT OFFICE

KARL SCHAPEL, OF NORTH HOLLYWOOD, CALIFORNIA

SAFETY PROPELLER

Application filed February 8, 1930. Serial No. 426,836.

This invention relates to safety device for air planes and has for its principal object the provision of means to prevent the abrupt or sudden falling of an air plane in case its engines or the wings or the aileron, or the elevators in the tail structure should, for any reason fail to properly function.

The invention contemplates the provision of an auxiliary propeller of the helicopter type normally housed within the body or fuselage of the plane, and means which readily enable the pilot to cause the propeller to be ejected from the body, and further the provision of means to cause said propeller to revolve at a rate of speed sufficient to cause the plane to either remain stationary in the air or to slowly descend.

In the accompanying drawings, four sheets:

Figure 1 indicates an air plane in flight, showing the safety propeller in operative position, indicated in dotted lines.

Fig. 2 is a broken side elevation of an air plane showing the safety propeller projecting from above the fuselage of an air plane.

Fig. 3 is a sectional elevation on line 3—3, Fig. 2, showing the safety propeller as it would be alined in the medial horizontal plane of the fuselage.

Fig. 9 is a side elevation showing the mechanism operated upon vertical movement of the motor to cause doors to open to permit the safety propeller to be projected from the fuselage.

Fig. 10 is a plan view of the device described in Fig. 9.

Fig. 11 is a side elevation partly in section showing the oscillating plungers or arms and their socket connections with the doors, adapted to open or close the doors upon an upward or downward movement of the motor.

Figure 1:
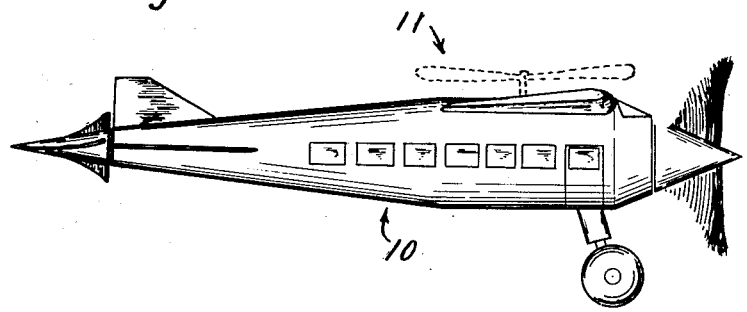

Referring to Fig. 1, 10 indicates an air plane of standard construction equipped with a propeller of the type shown in my copending application, Serial No. 335,899, filed Jan. 29, 1929, and showing my safety propeller 11 in operating position.

Figure 4:
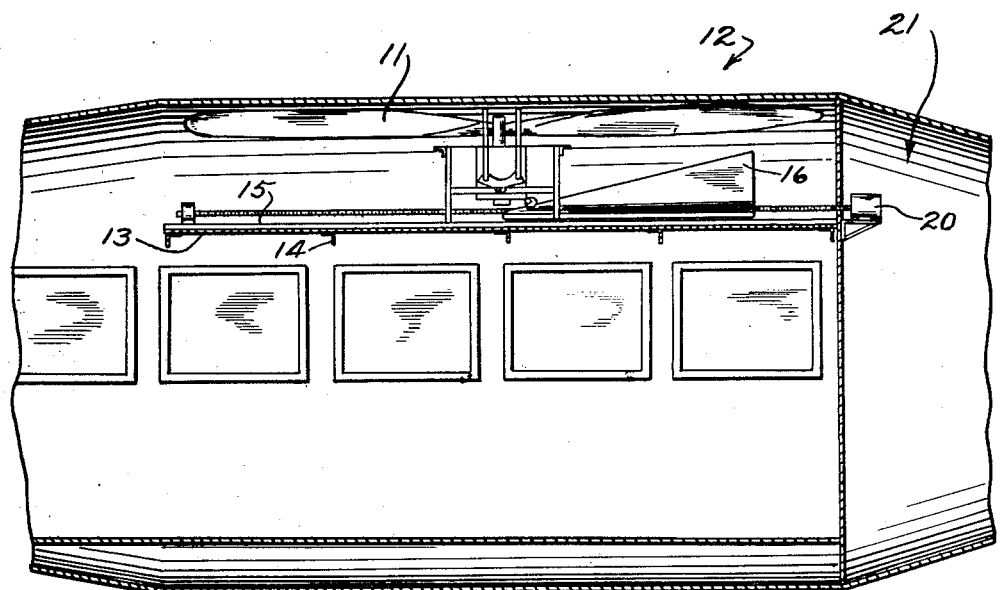
Fig. 4 is a mid-sectional elevation showing the safety propeller housed within the fuselage and showing the operating mechanism for causing the safety propeller to be forced from within the fuselage to the operating position shown in Figs. 2 and 3.

Referring more particularly to Fig. 4, it will be seen that the safety propeller unit 12 is supported upon a platform 3 resting upon angle members 14 which are secured transversely of the fuselage and are secured in the sides thereof, resting upon the platform 13 and extending the length thereof I lay a channel track 15 upon which a wedge 16 having rollers 17 pivoted in flanged base 18 of the wedge 16 is adapted to move reciprocably the length of the track upon revolution of the screw 19 which may be driven by any suitable means, but is here shown as being preferably driven by an electric motor 20.

Figure 5:
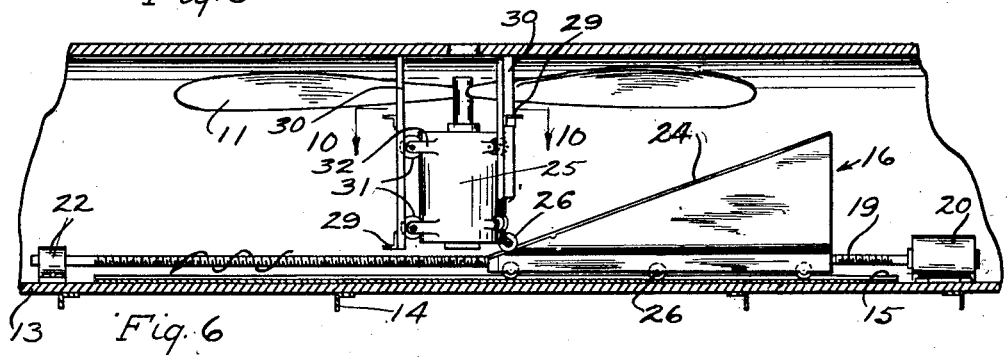
Fig. 5 is a detail showing the safety propeller, its driving motor, the slidable wedge elevator and motor driven screw which operates the wedge to cause the motor to be raised and the propeller to be lifted from within the fuselage.
Figure 6:
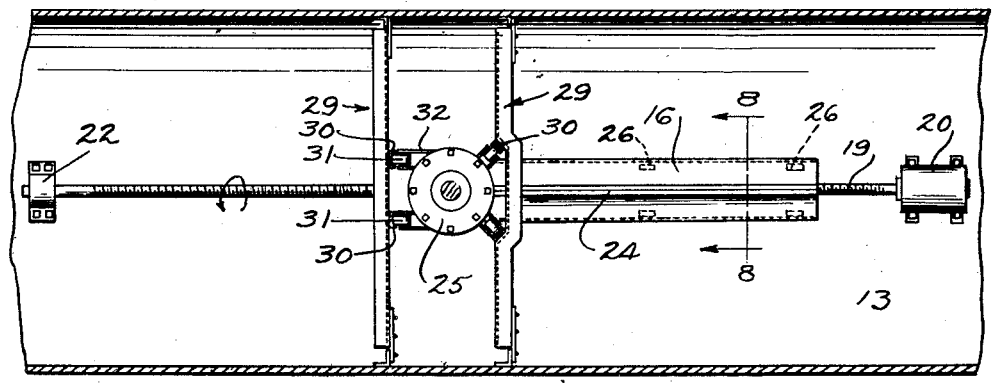
Fig. 6 is a plan view of the structure described in Fig. 5, taken on line 6—6, Fig. 5.
Figure 7:
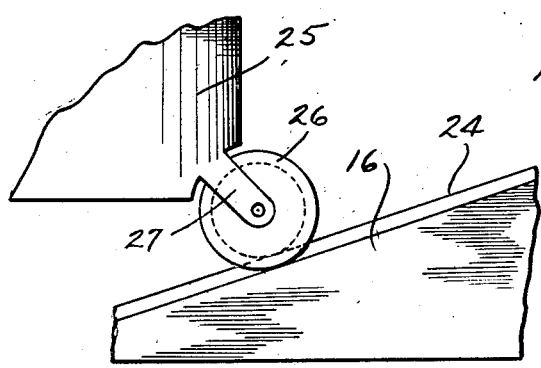
Fig. 7 is a fragmental detail of a section of the wedge, showing the motor and the roller supports pivoted in the wedge base.
Figure 8:
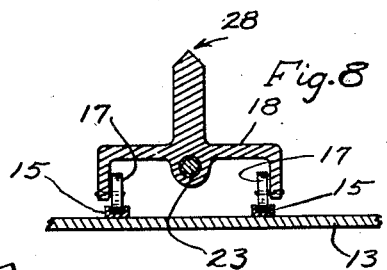
Fig. 8 is a sectional elevation on line 8—8, Fig. 6, showing the wedge in section, its operating screw and the rollers and tracks upon which the wedge moves.

In the drawings it will be observed that the relative position of the motor 20 in Fig. 4 differs from that in Figs. 5 and 6, this difference was made for the purpose of elucidating the invention. The position shown in Fig. 4 is the preferred position, but in actual construction it is proposed that the motor 20 be operated from a pilot's cabin, although none of the details of construction have been embodied for the reason that it forms no part of the present invention.

As shown in the drawings and particularly in Fig. 5, the motor 20 is directly coupled with the screw 19, the opposite end of which is journalled in a bearing 22 which is directly bolted to the floor or platform 13. The wedge 16 is bored and tapped and said bore 23 operatively receives the threaded screw 19.

The wedge 16 is shown with an inclined edge 24 and a side flanged base 18 which makes the wedge laterally stable upon the platform 13. Near the foot or lower edge of the incline 24 I place a motor 25 which has a fixed grooved roller 26 secured thereto by means of a bracket 27, the roller 26 being adapted to roll over the inverted V shaped edge 28 of the inclined wedge 16. A structure 29 comprising angle irons positioned transversely of the fuselage forms the lateral support for channel track ways 30 which extend vertically with respect to the transverse members 29. The channel track ways are adapted to receive a plurality of rollers 31 which are pivoted in brackets 32 secured to the motor 25. It will thus be seen that as the motor 20 is revolved the screw 19 will also be revolved and as it turns, the wedge 16 will be forced along the length of the screw, thus forcing its way under the motor 25 which, by means of the roller 26 will ride over the inclined plane 24 of the wedge 16, thus continuously forcing the motor 25 to a higher elevation until its uppermost position is attained, which position is not indicated in the drawings, as it is believed that it would merely be superfluous detail and that from the foregoing description the position will be readily understood.

As shown in Figs. 9 and 11, the fuselage 10 is provided with doors 35 which are hinged at 36 to the fuselage and in order to properly and successfully operate my safety propeller it is necessary that structural means be provided whereby the door 35 may be opened to permit the propeller 11 to be projected from the fuselage and after which projection, to close the doors to normal position, and also when it is desired to lower the safety propeller that the doors may be opened, during which time the propeller is lowered within the fuselage. The following structure is intended to provide means to accomplish the foregoing operation.

As shown in Figs. 9 and 10, parallel members 37 and 38 form a base upon which cams 39 are pivoted by means of pins 40. Arms 41 are pivoted near the ends of the cams and extended upwardly and are slidably fitted within sleeves 42 which are swivelly mounted in the halves 43 and 44 of the door 35 by means of a common ball and socket arrangement 45.

As shown in Fig. 9, a pin 46 is fixed to the side of the motor 25 where it will be seen that as the motor is forced upwardly by reason of the sliding action of the wedge 16, the pin 46 being integral with the motor 25 will be raised concurrently therewith and that as the pin rises it will engage the lower face 47 of the cam 39, thus causing the one end of the cam to be raised and the other end to be lowered to the approximate position shown in dotted lines at 48, thus action will cause the arms 41 to be raised and to slide within the sleeve 42. When the arm has moved through the sleeve and has come to rest against the bottom thereof, continued upward motion will cause the doors to be raised and to be swung outward upon their hinges 36.

This movement is immediately prior to moving the propeller through the doorway. After the pin 46 has tilted the cam 39 to the position indicated at 48, the pin will slide over the end 51 of the cam 39, after which time the spring 52 will cause the arm 41 and cam 39 to be returned to normal position, which movement will allow the doors to return to normal position by gravity. Upon energizing the motor 20 and causing the motor and screw 19 to be reversely rotated to cause the wedge 16 to be reversely moved and allowing the motor 25 to be lowered, it will be seen by referring to Fig. 9 that the pin 46 which has moved to the position indicated by dotted lines 46' will be above the cam 39 and that upon continuing the downward movement of the motor 25 the pin 46' will engage the upper arcuate surface 53 of the cam 39, thus causing the arm 41 to be retracted and causing the arm 41' to move upwardly to open the door for readmission of the safety propeller to within the fuselage.

From the foregoing description of structure it will be seen that I have provided means which enables a pilot to cause a propeller of the helicopter type to either be placed in operative position externally of the fuselage or to be retracted to within the fuselage when desired. The foregoing structural description has been directed solely to structural features which are essential to the satisfactory operation of my device.

Figure 12:
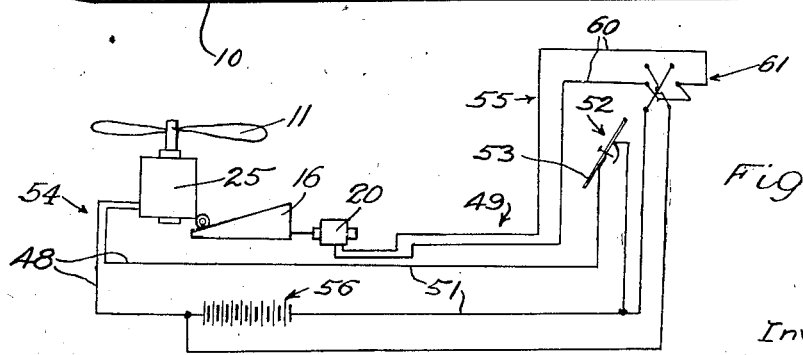
Fig. 12 is a wiring diagram showing the motors, in wired relation to a storage battery having a running switch and a reversing switch.

In Fig. 12, I show electrical circuits 54 and 55.

In the circuit 54, I include the propeller motor 25, a storage battery 56, a wired circuit 48 and a switch 52 mounted upon an instrumental panel 53 which may be firmly secured to the frame of the control cabin 21.

The circuit 55 includes the wedge operating motor 20, wires 60, the battery 56, and a reversing switch 61 which enables the pilot to control the direction of rotation of the motor 20.

I will now describe the operation of my invention.

Assuming that a plane is in normal flight as indicated in Figure 1, and that for some reason, some essential part of the machine should fail, and that a forced landing is impending, and further it is assumed that all parts of my safety propeller are normally housed within the fuselage as shown in Fig. 4, it then becomes only necessary for the pilot to close an electrical switch to energize the motor 20, thus causing the motor and screw to be so operated as to cause the wedge 16 to move horizontally along the track 15, thus causing the motor 25 to be raised vertically by reason of the fact that the wedge 16 is forced under said motor 25. As the motor is raised, the pin 46 engages the cam 39, causing arm 41 to be swung vertically within the sleeve 42 and causing the door 43 to be outwardly moved on its hinge 36. Concurrently with the opening of the doors 35 the safety propeller 12 will move through the doors and will reach the position indicated in dotted lines in Figure 1 where it will revolve about its axis, being so driven by the motor 25, power to which has been supplied by a circuit from the battery. The action of the safety propeller will enable a ship to slowly descend to earth and after the plane has alighted on the ground, the pilot, by reversing the rotation of the motor 20 will cause the parts above described to be reversely moved and to cause the safety propeller to be retracted within the fuselage. While I have shown the preferred form of my invention as now known to me, I am fully aware that various changes, modifications or transpositions may be made in the structure set forth without departing from the spirit of the invention as set forth and that I wish it to be known that I claim any and all forms of construction that fall within the reasonable scope of this invention.

I claim:—

1. In combination with an air plane safety propeller of the helicopter type, means to cause said propeller to be vertically moved, said means comprising a motor, a screw actuated by said motor, a wedge actuated by said screw, a propeller driving motor adapted to move upwardly over an inclined edge of said wedge as it is actuated, and means actuated by elevation of said propeller motor to effect opening of doors prior to projection of said propeller from a fuselage.

2. In combination with an air plane safety propeller of the helicopter type, means to cause said propeller to be vertically actuated, and means associated with the elevation of said propeller to cause an opening in said fuselage through which said propeller may be projected prior to the ejection of said propeller.

3. In combination with an air plane of the cabin type, a helicopter propeller, normally housed within said air plane, a motor in direct driving relation to said propeller, a wedge slidably oscillatable under said motor, a motor driven screw to effect said oscillation, and arms actuated by elevation of said motor to open doors in the roof of said air plane to permit the ejection of said propeller.

4. In combination with an air plane of the cabin type, a helicopter propeller normally housed within said air plane, a motor in direct driving relation to said propeller, a cage to operatively support said motor, a shoe slidable under said motor, a second motor, means intermediate said motor and said shoe to actuate said shoe, a base, a cam pivoted on said base, means on said motor to engage said cam to actuate it, and means actuated by actuation of said cam to effect reciprocation of arms adapted to open doors in the roof of said plane.

5. In combination with an air plane, a helicopter propeller, a motor to drive said propeller, a motor driven wedge to raise said propeller and driving motor, doors in the roof of said air plane, a cam, arms pivoted to said cam and slidably joined to said doors, and a pin on said motor adapted to engage and oscillate said cam to effect upward movement of said cam and said arms to open said doors.

In testimony whereof, I have hereunto set my hand.

KARL SCHAPEL.